(12) United States Patent
Zhang et al.

(10) Patent No.: US 8,566,165 B1
(45) Date of Patent: Oct. 22, 2013

(54) PERFORMANCE-EFFICIENT SYSTEM AND METHOD FOR SAMPLING USERS FOR POPULATION-CENTRIC ACTIVITY MODELING

(75) Inventors: Rui Zhang, San Francisco, CA (US); Richard Chow, Sunnyvale, CA (US); Maurice Kyojin Chu, Burlingame, CA (US); Kurt E. Partridge, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/436,348

(22) Filed: Mar. 30, 2012

(51) Int. Cl.
*G06Q 30/00* (2012.01)
*G06Q 10/00* (2012.01)

(52) U.S. Cl.
USPC ............... 705/14.66; 705/7.38; 705/7.39

(58) Field of Classification Search
USPC ..................... 705/14.66, 7.11–7.42
See application file for complete search history.

(56) References Cited

U.S. PATENT DOCUMENTS

| | | | | |
|---|---|---|---|---|
| 5,754,939 | A * | 5/1998 | Herz et al. | 455/3.04 |
| 6,839,680 | B1 * | 1/2005 | Liu et al. | 705/7.33 |
| 8,195,522 | B1 * | 6/2012 | Sonne et al. | 705/26.2 |
| 8,352,319 | B2 * | 1/2013 | Wang et al. | 705/14.53 |
| 2004/0117239 | A1 * | 6/2004 | Mittal et al. | 705/10 |
| 2010/0299388 | A1 * | 11/2010 | Bolnick et al. | 709/203 |
| 2011/0125744 | A1 * | 5/2011 | Immonen et al. | 707/737 |

* cited by examiner

*Primary Examiner* — Lynda Jasmin
*Assistant Examiner* — Sujay Koneru
(74) *Attorney, Agent, or Firm* — Shun Yao; Park, Vaughan, Fleming & Dowler LLP (57) ABSTRACT

A performance-efficient activity-modeling system generates a group-activity model for a population group using information from an optimal subset of users of the population group. During operation, the system computes utility scores for a set of users based on a utility-scoring function, such that a respective utility score indicates a usefulness or penalty of collecting a corresponding user's contextual information. The system then selects, from the set of users, a subset of users with highest utility scores, and receives user information from each of the selected users. The system generates the group-activity model based on the user information received from the selected users.

21 Claims, 8 Drawing Sheets

PERFORMANCE-EFFICIENT SYSTEM AND METHOD FOR SAMPLING USERS FOR POPULATION-CENTRIC ACTIVITY MODELING

RELATED APPLICATION

The subject matter of this application is related to the subject matter of the following applications:

U.S. patent application Ser. No. 13/402,751, entitled "AUTOMATICALLY TRIGGERING PREDICTIONS IN RECOMMENDATION SYSTEMS BASED ON AN ACTIVITY-PROBABILITY THRESHOLD," by inventors Rui Zhang, Kurt E. Partridge, Robert R. Price, James M. A. Begole, and Maurice K. Chu, filed 22 Feb. 2012;

U.S. patent application Ser. No. 13/403,129, entitled "A PERFORMANCE-EFFICIENT SYSTEM FOR PREDICTING USER ACTIVITIES BASED ON TIME-RELATED FEATURES," by inventors Rui Zhang, Kurt E. Partridge, James M. A. Begole, and Robert R. Price, filed 23 Feb. 2012; and U.S. patent application Ser. No. 13/429,139, entitled "A DISTRIBUTED SYSTEM AND METHODS FOR MODELING POPULATION-CENTRIC ACTIVITIES," by inventors Rui Zhang, Maurice Kyojin Chu, Kurt E. Partridge, and James M. A. Begole, filed 23 Mar. 2012;

the disclosures of which are incorporated by reference in their entirety herein.

BACKGROUND

1. Field

This disclosure is generally related to activity-based recommender systems. More specifically, this disclosure is related to selecting an optimal subset of users to use as a basis for generating a group-activity model for a population of users.

2. Related Art

Advances in mobile computing have allowed people to consume digital information at any place and any time. It is common for laptops to boast a sufficiently long battery life to allow a user to complete a near full day of work on a single charge. If the user needs an Internet connection, the user is oftentimes able to find a public Wi-Fi hot spot at a local coffee shop or a public venue such as a park. As another example, the capabilities of smartphones have increased drastically to rival the computing abilities of laptops, while also providing steady access to the Internet through a cellular network. These advances have allowed users to perform their computing tasks at a coffee shop, on a park bench, or virtually anywhere. Oftentimes, a user may take his mobile phone out from his pocket for brief moments at a time to play a quick game while riding in a bus, to read the news while waiting in line at a store, or to search for information as necessary.

However, this mobile nature of modern computing has made it difficult to provide targeted recommendations to a user. Previous recommender systems expected a user to be using a computer at home or at work, with an open mind to consider recommendations. A modern computer user is constantly on the go, and may look at his mobile device for short periods at a time. The user may accept a recommendation if it matches his current activity, and may ignore a recommendation that isn't appealing or convenient considering his current activity.

For example, a typical recommender system on a Web service may analyze behavior patterns for many individual users to make a recommendation that is targeted to a certain user. The recommender system may group multiple users that have a similar behavior pattern into a group, and may recommend a product or a service to an individual user based on purchases made by other users in his group. One example of this recommender system includes the movie recommendation system used by Netflix, Inc. to recommend movies to a viewer based on the movie ratings of other similar users. Another example is the product recommendation system used by Amazon, Inc. to recommend products to the user as the user browses Amazon's online catalog.

To be effective, the recommender system needs to store and process a history of detailed information about these users' behavior, and use this information to make future recommendations for these users. Also, when making a recommendation for a user, the recommender system needs to know what the user is doing, such as which merchandise items the user is browsing. However, many users don't feel comfortable having their behavior information tracked and analyzed by a recommender system on a remote server, and would prefer not to let the recommender system know what they are currently doing.

SUMMARY

One embodiment provides a system that generates a group-activity model for a population group using information from an optimal subset of users of the population group. During operation, the system computes utility scores for a set of users based on a utility-scoring function, such that a respective utility score indicates a usefulness of a corresponding user's information. The system then selects, from the set of users, a subset of users with highest utility scores, and receives user information from each of the selected users. The system generates a group-activity model based on the user information received from the selected users.

In some embodiments, while generating the group-activity model, the system generates a set of group-parameter distributions for the population:

$$N_0(A,\sigma_0), N_1(B_1,\sigma_1), \ldots N_n(B_n,\sigma_n).$$

In the group-parameter distributions, $N_i$ corresponds to a normal distribution for a curve-fitting parameter of the identified group. The symbols A and $B_i$ correspond to average values for the corresponding curve-fitting parameters, and the symbol $\sigma_i$ corresponds to a standard deviation for a corresponding curve-fitting parameter.

In some embodiments, the user-activity model includes an activity function of the form:

$$p=\text{logit}(a+b_1{}^*x_1+b_2{}^*x_2+\ldots+b_n{}^*x_n).$$

In the user-activity model, p is a probability that the determined information about the local user corresponds to a target activity. The values a and $b_i$ correspond to the curve-fitting parameters, and $x_i$ corresponds to a context feature value.

In some embodiments, the system computes an accuracy score for the group-activity model based on an accuracy-scoring function and the user information received from the selected users.

In some embodiments, the system computes a difference between the computed accuracy score and a previous accuracy score. Then, in response to determining that the computed difference is greater than a minimum-threshold, the system generates an updated group-activity model. To generate the updated group-activity model, the system selects an additional subset of users with highest utility scores, and receives user information from the additional subset of users. The system then generates the updated group-activity model based on the user information received from the selected users.

In some embodiments, the utility-scoring function has the form:

$$U(u)=a*I(u)-b*P(u).$$

In the utility-scoring function, U(u) provides a utility score for the user information from user u, and a and b correspond to predetermined coefficients. I(u) corresponds to an information-gain function that computes an information-gain score indicating the usefulness of the user's information. P(u) corresponds to a penalty-scoring function that computes a communication penalty indicating the user's perceived cost for releasing personal information.

In some embodiments, the system determines one or more information-sharing parameters for a user. These information-sharing parameters can include parameters from an explicit privacy policy configured by a user, and/or an implicit privacy policy determined for the user based on the user's behavior patterns. The information-sharing parameters can also include explicit and/or implicit rewards obtained by the user for releasing personal information, and can include a bandwidth cost and/or an energy cost to the user per unit of data communicated over a network. The system then computes the user's communication penalty based on the determined information-sharing parameters.

In some embodiments, the user information includes at least one of: contextual information; profile information from a user profile; historical activities performed by a user; aggregated contextual information; and aggregated activity information.

In some embodiments, the contextual information includes at least one of: a geographic location; a motion trajectory; a date range; a logical name associated with a geographic location; a logical name associated with an activity description; a list of participants of the historical activity; and a set of keywords associated with the historical activity.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide an activity-modeling system that solves the problem of selecting an optimal subset of users in a population group from which to generate a population-centric activity model (hereinafter also referred to as a group-activity model). This subset of users, for example, can include users that are willing to share their personal information, and whose historical behavior information can increase the accuracy of the group-activity model. The group-activity model represents the conditions under which users in the population group may perform a certain target activity.

When the system selects a user to use as a source of information to train the group-activity model, the system receives information about the user from the user's client device. This information, for example, can include aggregated behavior data about the user, or an activity model that represents the user's behavior. The activity-modeling system can use the information it receives from multiple users in the population to generate the group-activity model, and can provide this group-activity model to users of the population to facilitate predicting information about their current activities.

Some users in the population group may be resistant to sharing their personal information, or their client devices may not have enough historical activity information for the local user to make any meaningful recommendations. While these users are not a good source of information to train an activity model, they may be active consumers that wish to receive coupons while shopping at the mall, or receive recommendations to restaurants in their current vicinity that they would enjoy visiting. The activity-modeling system can match these users with a population group of other similar users, and can provide group-activity models to their client devices so that they can leverage information obtained from other similar users to predict information about the local user's current activity.

Individuals within a population group oftentimes have behavior patterns that are similar to other users in their population group. People within a geographic region, for example, are likely to be loyal fans of a local sports team, and so they may be likely to watch a championship game either at home or with friends when their local team is playing in the championship game. As another example, members of a social club or people that are mutual "friends" on an online social network may have similar activity interests, and may be likely to perform a certain activity when facing certain specific conditions. These group members may be interested in purchasing similar types of merchandise while shopping, or they may be interested in performing similar types of activities during the weekend.

When a user's client device receives the group-activity model from the activity-modeling system, the client device uses the group-activity model to generate a user-centric activity model (hereinafter also referred to as a user-activity model) for the local user. The client device can use the user-activity model (or the population-modeling server can use the group-activity model) to analyze the user's behavior, for example, to predict whether the local user is performing the target activity. As another example, the server or the client device can use the activity model to classify the user's behavior to determine whether the user is behaving normally or abnormally relative to an expected behavior pattern (e.g., the user's previous behavior pattern, or that of other users in a population). Further, in response to the user performing a certain activity, the server or the client device can use the activity model to determine why the user may have decided to perform or otherwise participate in the activity. The client device can use the information it learns from analyzing the user-activity model to generate a recommendation for the user.

Figure 1:
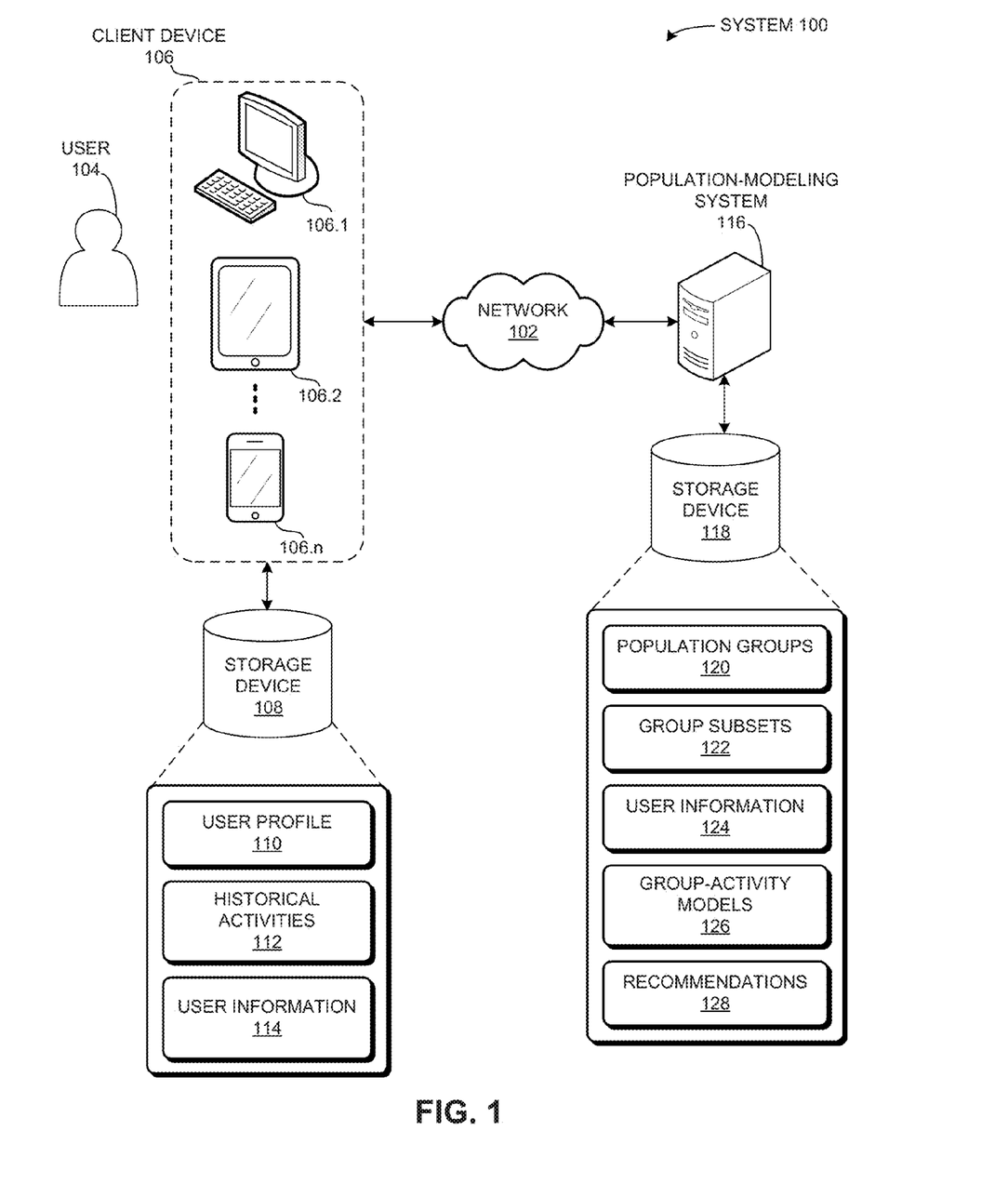
FIG. 1 illustrates an exemplary computing environment in accordance with an embodiment.

FIG. 1 illustrates an exemplary computing environment 100 in accordance with an embodiment. Computing environment 100 can include network 102, a client device 106, and a population-modeling system 116. Computing device 106 can include any personal computing device that gathers contextual information for a user 104. For example, computing device 106 can include a personal computer 106.1, a tablet computer 106.2, a smartphone 106.$n$, or any other computing device such as a laptop, an internet-enabled television, etc. Client device 106 can be coupled to a storage device 108, which can store at least a user profile 110, historical activities 112, and user-activity models 114 for user 104.

During operation, client device 106 can monitor the behavior and activities of user 104 to generate contextual information 112. A historical activity can include a snapshot of contextual information about user 104 for a period of time before the user performs a certain activity and/or while the user is performing the activity. The historical activity can also include a deterministic activity indicator that client device 106 can use to determine the activity that was performed by user 104. The deterministic activity indicator can include, for example, a geographic location and/or an activity that user 104 performs at the geographic location (e.g., jogging at Central Park), a name of a store, a name of an event, etc. The contextual information can include a geographic location, a motion trajectory, a time range, a logical name associated with a geographic location, Email/short messaging service (SMS) messages, audio recordings, shows or movies viewed by user 104, web page views, and any other information that is gathered about the behavior and activities of user 104.

Client device 106 can use historical activities 112 to generate aggregated data for user 104, and sends information about user 104 (e.g., the aggregated data, historical activities 112, and/or a group identifier) to population-modeling system 116. Client device 106 can also receive group-activity models that population-modeling system 116 generates for a population of users to which user 104 belongs, and uses these group-activity models to generate user-activity models for user 104. Client device 106 can use these user-activity models to predict the behavior of user 104 and to generate a recommendation (e.g., an advertisement or a coupon) that is targeted to the user's current activity.

Population-modeling system 116 can also include any computing device or group of computing devices coupled to network 102. Population-modeling system 116 can be coupled to a storage device 118, which can store at least population groups 120, group subsets 122, user information 124, group-activity models 126, and product recommendations 128. Population groups 120 can include any user group that user 104 is affiliated with or is similar to in some way. For example, a population group can include other users within a geographic region (e.g., a city, a state, a country, etc.) or a group of friends in an on-line social network. The population group can also include a group of users that are affiliated with a certain organization, such as a company, a volunteer group, a political party, etc. Further, a population group can include any group that user 104 is assigned to, such as a group of other users that have been determined to have similar behavior patterns to user 104, regardless of whether user 104 is directly affiliated with these other users or not.

Population-modeling system 116 can select group subsets 122 to include, for each population group, an optimal subset of users whose information provides the most value to the population's group-activity model. Population-modeling system 116 receives user information from the individual users in group subsets 122, and stores the received user information in association to their corresponding population group. Population-modeling system 116 uses the information from group subsets 122 to generate group-activity models for population groups 120, such that these group-activity models can be used to process data about user 104 to determine information about the user's activities.

Storage device 118 can also store a plurality of recommendations 128, such that each recommendation is associated with certain contextual information for a target activity. When population-modeling system 116 sends a group-activity model to client device 106, population modeling system 116 can also send one or more recommendations associated with the target activity to client device 106. Client device 106 can present a recommendation to user 104 when it determines that user 104 is performing a corresponding target activity.

Figure 2:
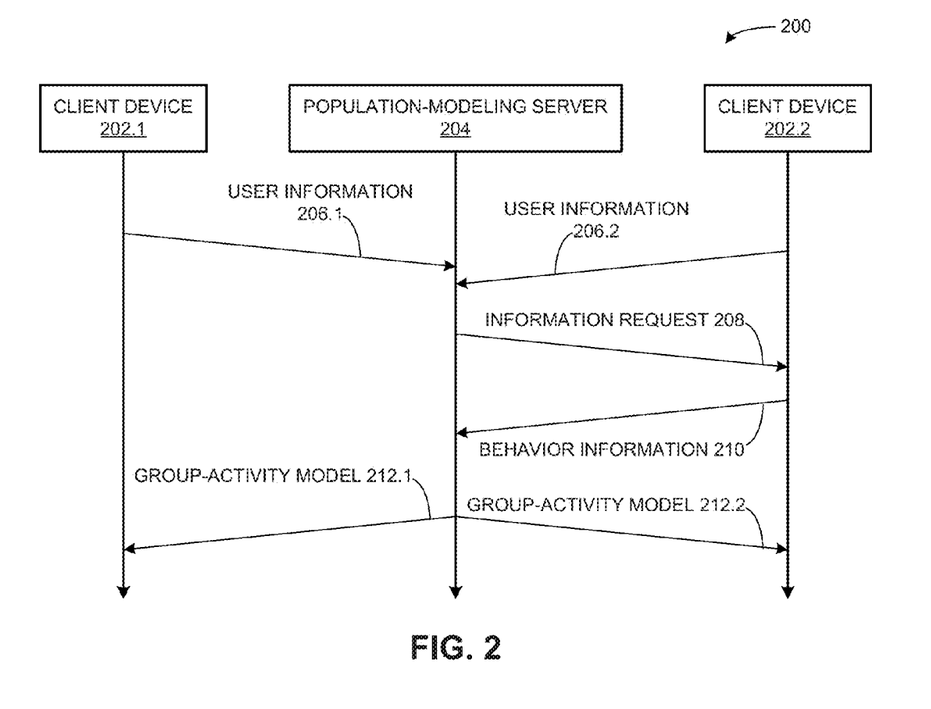
FIG. 2 illustrates an exemplary communication between a population-modeling server and client devices in accordance with an embodiment.

FIG. 2 illustrates an exemplary communication 200 between a population-modeling server 204 and client devices 202 in accordance with an embodiment. During operation, population-modeling server 204 can receive user information 206 from client devices 202. User information 206 can include a group identifier that matches a user to a population group, as well as user-profile information that can be used to determine whether a user is an ideal source of information for generating a group-activity model. Population-modeling server 204 can use user information 206 to select a subset of users of the population group (e.g., a user of client device 202.2) that would be an ideal source of information for generating or training a population-centric activity model.

Population-modeling server 204 sends an information request 208 to the client devices of the selected users (e.g., to client device 202.2), and receives behavior information 210 from these client devices. Behavior information 210 can include, for example, contextual information about the selected users (e.g., the local user to client device 202.2), such as raw contextual information or aggregated contextual information. Population-modeling server 204 uses behavior information 210 to generate or update a group-activity model 212 for the population group, and sends group-activity model 212 to client devices 202 that are associated with the population group.

Population-Modeling System

The population-modeling system can receive behavior information from a representative subset of users in a community, and can generate a group-activity model for this community using the information from the selected users.

The system can also update the group-activity model periodically by receiving updates to the users' behavior information from their devices, and sends the updated group-activity model to the community when the system detects a significant change in behavior from the community.

Figure 3:
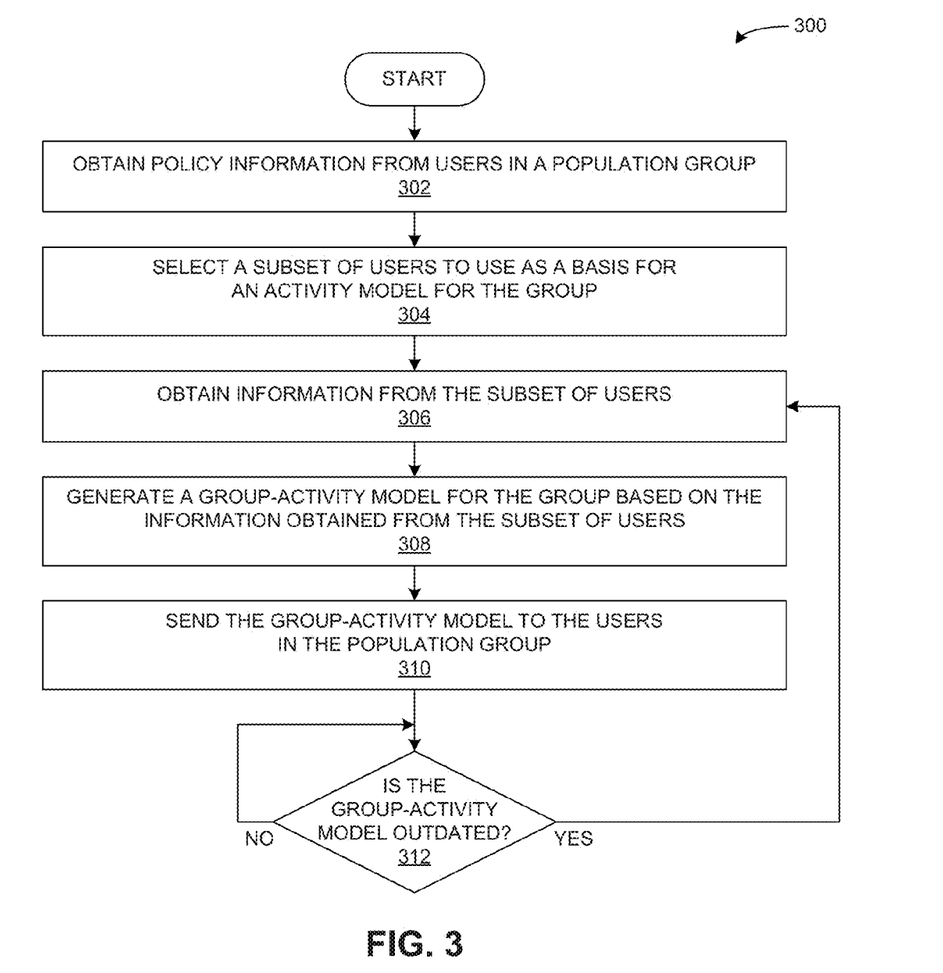
FIG. 3 presents a flow chart illustrating a method for generating and updating a group-activity model over time in accordance with an embodiment.

FIG. 3 presents a flow chart illustrating a method 300 for generating and updating a group-activity model over time in accordance with an embodiment. During operation, the system obtains information from users in a population group (operation 302). This information can include information from a user's profile (e.g., an explicit privacy policy, and a demographic for the user), and can include configuration information for the user's client device (e.g., whether the client device can accept cookies, or performs any other measures to protect the user's online security and privacy). This information can also include behavior information about the user.

The system can use the collected information to select a subset of users to use as a basis for a group-activity model for the group (operation 304). To generate the group-activity model, the system obtains information from the selected subset of users (operation 306), and generates the group-activity model for the group based on the information obtained from the subset of users (operation 308). During operation 306, the system can obtain any information that can be used to determine whether the user has or is likely to perform a certain target activity. For example, the system can obtain demographic information about the user that can be used to determine whether it's feasible for the user to perform the target activity (e.g., area of residence, current location, hobbies, education background, etc.). The system can also obtain behavior information that can be used to determine under which conditions the user has performed the target activity. This behavior information can include contextual information that has been gathered by the user's client device whenever the user performed the target activity, and/or can include aggregated behavior information that has been compiled for the user for a set of target time frames. The contextual information, for example, can be obtained from the user's historical activities that match the target activity. The client device can generate the aggregated behavior information so that it includes a total number of times that the device has detected a certain context or activity (e.g., the user visiting a certain location), a number of occurrences during a certain time interval (e.g., for a certain month, or during the past month), an average frequency of the occurrences, an average time duration between occurrences, etc.

The aggregated data can also include a statistical distribution for the contextual information or activities detected by the client device. This statistical distribution may indicate the distribution of occurrence frequencies during a given time interval, such as the mean or median number of times that the user has visited a certain location during a week, as well as the standard deviation. This statistical distribution can also indicate a distribution of time intervals for the occurrences detected by the client device, such as the mean or median time duration for each detected context or activity, and the standard deviation.

In some embodiments, the behavior information can include the curve-fitting parameters for a user-activity model that the client device has generated for the user based on the user's profile and/or behavior. This user-activity model can include a function of the form:

$$p=\text{logit}(a+b_1 *x_1+b_2 *x_2+\ldots+b_n *x_n) \quad (1)$$

In equation (1), the coefficients a and $b_i$ correspond to curve-fitting parameters for the user. The variable a is known as the intercept, and the variables $b_i$ are known as the regression coefficients. The value p specifies a probability that the user's contextual information ($x_i$) indicates that the user is performing a corresponding target activity. The variables $x_i$ in equation (1) correspond to real-time context feature values from the user that the client device can use to generate the probability p.

The system then generates the group-activity model for the group using the information obtained from the selected subset of users (operation 308), and sends the group-activity model to the users in the population group (operation 310). The group-activity model can include a function of the form presented in equation (1).

The system can periodically determine whether it needs to update the group-activity model (operation 312). For example, the system may update the group-activity model after a certain time period (e.g., one week), or when it has received information updates from a certain number or percentage of users in the group. As another example, the system may decide to update the group-activity model when a computed accuracy score for the group-activity model falls below a certain accuracy threshold.

If the system determines that the group-activity model has become outdated, the system returns to operation 306 to obtain information from the refined subset of users. In some embodiments, when the system determines that the group-activity model is outdated, the system may refine the subset of users before returning to operation 306.

However, if the system determines at operation 312 that the group-activity model is not outdated, the system can return to operation 312 after a determinable waiting period (e.g., one week).

To generate an optimal group-activity model without having to obtain privacy-sensitive behavior information from every user in the population group, the system selects an ideal subset of users whose information can provide the most value to the group-activity model. However, the system may not have enough a priori information from these users to determine which users can provide the most value to the group-activity model. If the system were to select an arbitrary number of users, the system may unintentionally select too few users, or may select the wrong users in the population group, thereby overlooking valuable behavior information from other users that are willing to share their information. Another possible consequence of selecting an arbitrary number of users is that the system may select too many users, which causes the system to gather privacy-sensitive behavior information from users that don't contribute much to the group-activity model.

In some embodiments, the system iteratively selects additional users for the group activity model until the remaining users don't provide sufficient value to the group-activity model. Doing so allows the system generate the group-activity model using behavior information only from those users that are willing and that can contribute valuable insight for the group-activity model, while safeguarding the privacy of all other users in the population.

Figure 4:
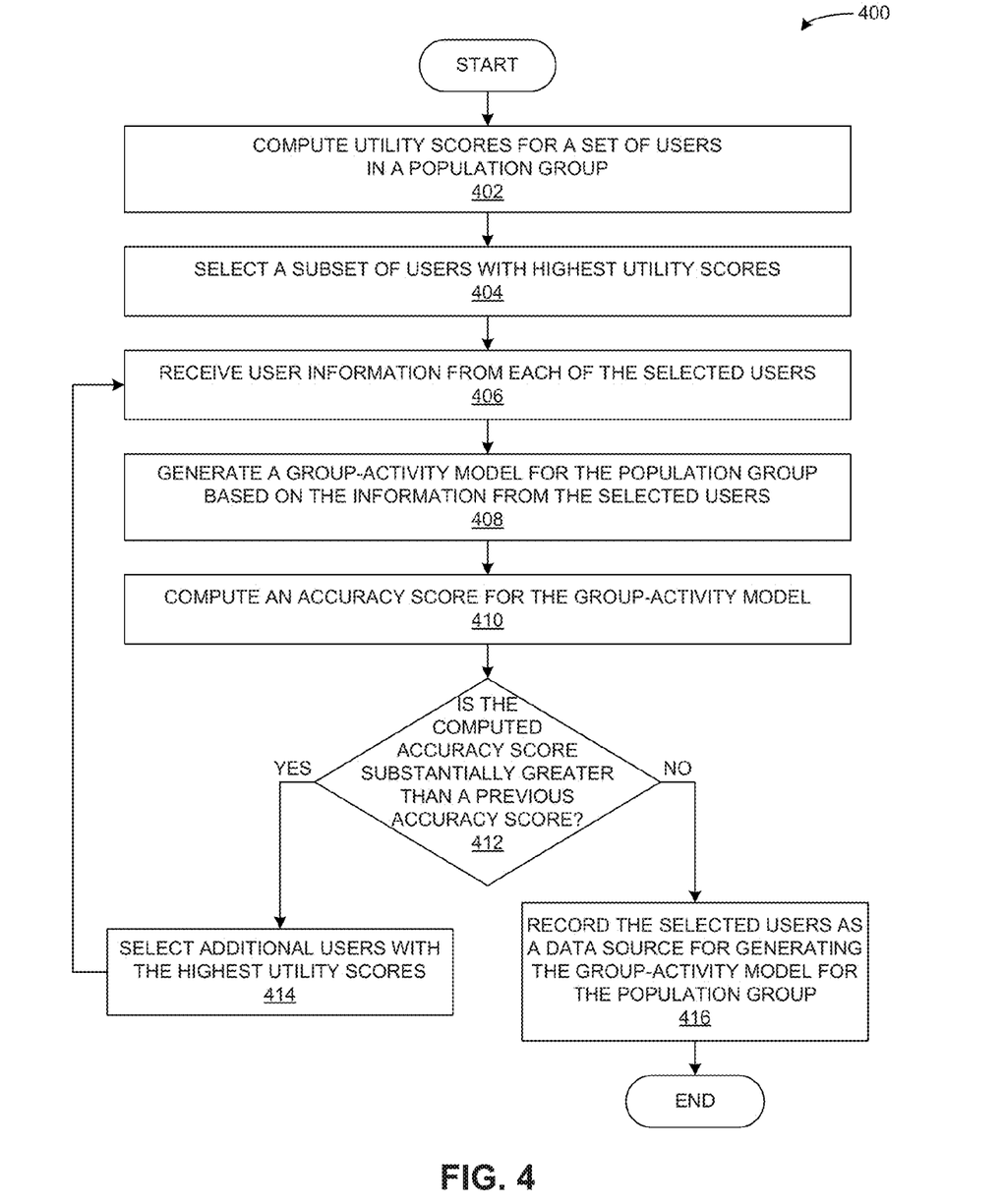
FIG. 4 presents a flow chart illustrating a method for selecting users to generate a group-activity model in accordance with an embodiment.

FIG. 4 presents a flow chart illustrating a method 400 for selecting users to generate a group-activity model in accordance with an embodiment. During operation, the system can compute utility scores for a set of users in a population group (operation 402). The set of users, for example, can include a plurality of users associated with a common group identifier. The system then selects a subset of users that have highest utility scores (operation 404), and receives user information from each of the selected users (operation 406). This user information can include any demographic information about the user that can be used to determine whether it's feasible for the user to perform the target activity, and/or can include any behavior information that can be used to determine the conditions under which the user may perform the target activity.

The system generates a group-activity model for the group based on the information obtained from the selected users (operation 408), and computes an accuracy score for the group-activity model (operation 410). The system then determines whether the computed accuracy score is substantially greater than a previous accuracy score (e.g., an accuracy score for a previous group-activity model) (operation 412). If the difference between the computed accuracy score and the previous accuracy score is greater than a predetermined threshold, the system selects additional users with the highest utility scores (operation 414), and returns to operation 406 to receive updated user information from the selected users and to generate the updated group-activity model for the population group. However, if the difference is not greater than the predetermined threshold, the system can record the selected users as a data source for generating group-activity models for the population group (operation 416), and can send the group-activity model to users in the population group.

In some embodiments, to compute the accuracy score A(M) for a group-activity model M, the system can use activity model M to process user information (e.g., contextual data) from a plurality of historical activities, and generates an activity probability for each historical activity. Each activity probability indicates a likelihood that the corresponding historical activity matches a target activity associated with group-activity model M. The system can compare the activity probabilities for the historical activities to a probability threshold to predict which historical activities match the target activity (e.g., which historical activities involve the user visiting a target location), and to generate a set of prediction success rates.

Table 1 presents exemplary prediction success rate categories in accordance with an embodiment of the present invention. TP corresponds to a true-positive prediction that correctly predicts a target activity (e.g., a visit to a target location), and FP corresponds to a false-positive prediction that incorrectly predicts the target activity. TN corresponds to a true-negative prediction that correctly predicts that the target activity did not occur (e.g., a target location was not visited), and FN corresponds to a false-negative prediction that incorrectly predicts that the target activity did not occur.

TABLE 1

|  | Visit | No Visit |
| --- | --- | --- |
| Predict a Visit | TP | FP |
| Predict No Visit | FN | TN |

In some embodiments, the system computes the accuracy score using an accuracy-scoring function:

$$A(M) = \frac{TP + TN}{TP + TN + FP + FN} \quad (2)$$

In equation (2), the accuracy-scoring function computes the accuracy as a ratio between the number of correct predictions to the total number of predictions.

In some embodiments, the system computes the accuracy score by computing an F-score for the group-activity model:

$$F_\beta(M) = (1 + \beta^2) \cdot \frac{\text{precision}(M) \cdot \text{recall}(M)}{\beta^2 \cdot \text{precision}(M) + \text{recall}(M)} \quad (3)$$

In equation (3), the system computes the accuracy as the harmonic mean between precision and recall. The system can compute the precision value, which is oftentimes referred to as a positive predictive value (PPV), as follows:

$$\text{precision}(M) = \frac{TP}{TP + FP} \quad (4)$$

The system can also compute the recall value, which is oftentimes referred to as a true positive rate, as follows:

$$\text{recall}(M) = \frac{TP}{TP + FN} \quad (5)$$

TABLE 2

INPUT:

n: a number of users selected per iteration;
P: a population of users that have not explicitly opted out of sharing data;
$T_A$: threshold for an accuracy-score gain;
$T_C$: threshold for a number of iterations that don't satisfy $T_A$.
PROCESS:

1. count = 0
2. Select n users S' = {$u_1$, . . . , $u_n$} from P to maximize Util($u_i$)
3. S = S + S'
4. P = P − S
5. Collect data from mobile devices of users in S
6. Train group-activity model $M_S$
7. $A_S'$ = $A_S$     //Save accuracy score of previous model
8. $A_S$ = A($M_S$)     //Measure accuracy score of current model
9. IF $A_S$ − $A_S'$ < threshold $T_A$
10. THEN count = count + 1
11. ELSE GOTO step 2
12. IF count > $T_C$
13. THEN EXIT
14. ELSE GOTO step 2
15. Return S Table 2 presents an exemplary algorithm for selecting users from which to gather behavior information when generating a group-activity model in accordance with an embodiment. During each iteration of the algorithm, the system selects, from population M, n additional users that have a maximum utility score. The system adds these users to a subset S, gathers information from client devices of user subset S, and uses this information to train a group-activity model $M_S$. The system computes an accuracy score $A_S$ for the group-activity model, and determines whether the gain in accuracy score ($A_S$−$A_{S'}$) is greater than a threshold value $T_A$. If so, the system performs another iteration to select more users. Otherwise, if the gain in accuracy score is not greater than threshold value $T_A$ for a certain number of iteration (e.g., $T_C$ iterations), the system returns the subset S as the ideal set of users to use for training the group-activity model.

Figure 5:
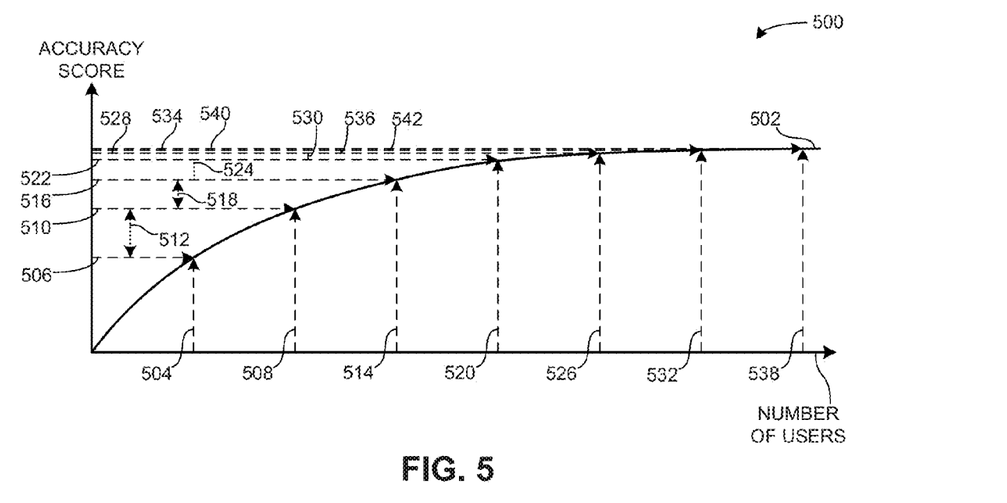
FIG. 5 presents a graph illustrating accuracy scores for various subsets of users of a population group in accordance with an embodiment.

FIG. 5 presents a graph 500 illustrating accuracy scores for various subsets of users of a population group in accordance with an embodiment. Graph 500 includes an x-axis that corresponds to a number of users that have been selected for a group-activity model, and includes a y-axis that corresponds to an accuracy score for the group-activity model. Graph 500 also includes an exemplary accuracy-score curve 502 illustrating the diminishing returns in accuracy score for each additional user.

During a first iteration, the system may select a number of users 504, and uses information from these users to generate a group-activity model that has an accuracy score 506. Then, when the system performs a subsequent iteration, the system selects additional users from the population to reach a number of users 508, and uses these users to generate an updated group-activity model that has an accuracy score 510. The system then determines an accuracy-score-gain 512 between accuracy scores 506 and 510, and proceeds to perform subsequent iterations after determining that accuracy-score-gain 512 is greater than a predetermined threshold value. Similarly, the system determines accuracy-score-gain values 518 and 524 for group-activity models corresponding to a number of users 508 and 514, respectively, and proceeds to perform other iterations after determining that accuracy-score-gains 518 and 524 are greater than the threshold value.

During the next iteration, the system uses information from a number of users 526 to generate an updated group-activity model that has an accuracy score 528, and computes an accuracy-score-gain 530 for the updated group activity model. The system may then determine that accuracy-score-gain 530 is not greater than the threshold value, and may proceed to select additional users until it determines that the accuracy score has not increased substantially for a certain number of iterations (e.g., three iterations).

During the following two iterations, the system uses information from a number of users 532 and 538 to generate updated group-activity models that have accuracy scores 534 and 540, respectively, and computes accuracy-score-gain values 536 and 542 for these group-activity models. Once the system confirms that the accuracy-score-gain value is not greater than the threshold value for three iterations (e.g., for accuracy-score-gain values 530, 532, and 534), the system can determine that the number of users selected so far provides an ideal subset of users that results in an optimal group activity model, and provides the group-activity model to the population of users. The system can use this subset of users, which corresponds to number of users 538, as a source for behavior information when updating the group-activity model at a later time. In some embodiments, the system can use the subset of users that accounted for the most-recent accuracy-score-gain value that was greater than the threshold value (e.g., number of users 520) as the source of behavior information for updating the group-activity model.

Figure 6:
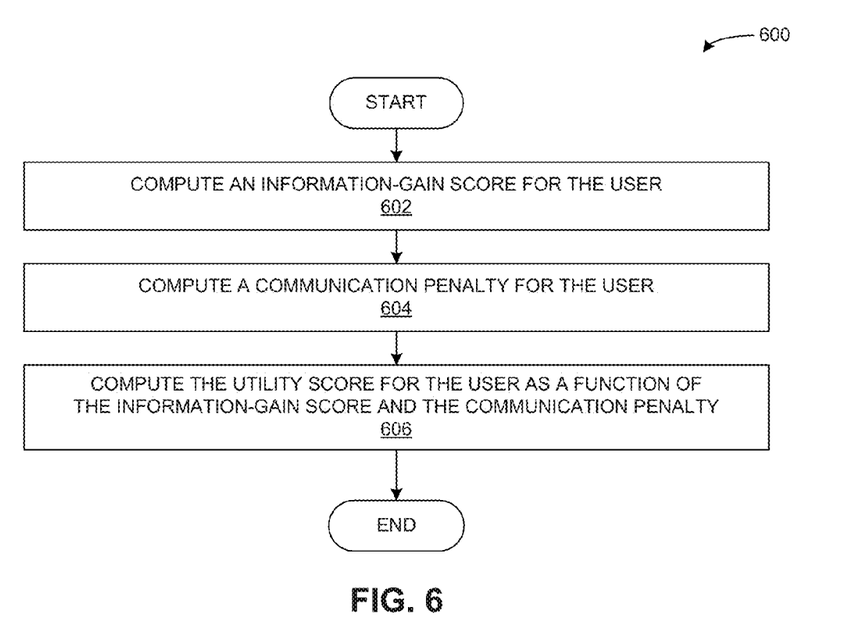
FIG. 6 presents a flow chart illustrating a method for computing a utility score for a user in accordance with an embodiment.

FIG. 6 presents a flow chart illustrating a method 600 for computing a utility score for a user in accordance with an embodiment. During operation, the system computes an information-gain score for the user (operation 602), and computes a communication penalty for the user (operation 604). To compute the information-gain score, the system can use any information-gain scoring function, I(u), that computes the score for a user u. The information-gain scoring function I(u) can include any function that can determine the amount of information that can be gained from the information obtained from user u. For example, function I(u) can include a function that computes an information-gain score for user u based on an amount of information available for user u, and/or based on an uncertainty value for the information about user u. The system can determine the uncertainty value, for example, from a standard deviation for the aggregated information about user u (e.g., a standard deviation for an average number of times that user u performs an activity x). The information-gain score can increase for users with a larger amount of information, and for users with a lower uncertainty value (a lower standard deviation for their aggregated information).

To compute the communication penalty, the system can use any penalty-scoring function, P(u), that can determine the cost perceived by user u for releasing personal information. For example, function P(u) can compute the communication penalty for user u based one or more information-sharing parameters attributed to the user. The system can determine these information-sharing parameters for the user based on explicit and/or implicit privacy policies associated with user u, based on explicit and/or implicit rewards perceived by user u for sharing personal information, and/or based on a bandwidth cost or energy cost to the user per unit data communicated over the network.

The explicit privacy policy can include privacy settings configured by user u that indicate whether and when user u allows a service to gather personal information (e.g., a privacy policy for an on-line social network, or for the population-modeling system). The implicit privacy policy can include any actions performed by user u to guard his personal information, such as a frequency at which user u checks and/or deletes Web-browser cookies. The implicit privacy policy can also include a frequency at which user u contributes information to an online social network and/or location check-in service, and/or a degree at which user u allows others to view his information on the online social network and/or location check-in service (e.g., immediate friends, friends-of-friends, everyone, etc.).

The explicit rewards can include a number of coupons received by user u, and/or a monetary amount saved or earned by user u, for using online applications or services. For example, a user can receive coupons from a retailer for participating in certain online activities related to the retailer, such as when checking into a web service while at the retailer's location. As another example, a user may frequently purchase coupons from a flash sale Web service. The system can quantify the user's inclination to participate in online social activities based on a number of coupons that the user has purchased and/or an amount saved by the user through these online activities.

The implicit rewards can include a reward or gratification perceived by user u from his participation with the online application or services. For example, a user may choose to participate with an online service (e.g., a crowd-sourced encyclopedia, such as Wikipedia) because he enjoys contributing information that would improve the quality of the online service. The system can quantify these implicit rewards by an amount of information that the user has chosen to contribute to the population-modeling system and/or other online services.

Function P(u) can also compute the communication penalty for user u based on the bandwidth cost and/or an energy cost to the user per unit of data communicated over a network. For example, the user's device may include a smartphone that communicates over a cellular network, and the user's data plan may have a low monthly data limit. Function P(u) may compute the communication penalty by accounting for a cost to the user for communicating the user's data over the network (e.g., based on a price per megabyte while within the data limit and/or a price per megabyte when over the data limit).

As another example, the user's smartphone may be equipped with an energy-inefficient communication chip and/or may have a small battery, such that communicating the user's behavior information may consume a significant portion of the smartphone's battery. Function P(u) may compute the communication penalty by accounting for an amount of energy (or percentage of battery power) that would be consumed by the user's client device when communicating the user's data over the network.

The system then computes the utility score for user u as a function of the information-gain score and the communication penalty (operation 606). The system can compute the utility score using a function:

$$U(u)=a*I(u)-b*P(u); \quad (6)$$

In equation (6), U(u) provides a utility score for the user information from user u, wherein a and b correspond to predetermined coefficients. The function I(u) corresponds to an information-gain function that computes an information-gain score indicating the usefulness of the user's information, and the function P(u) corresponds to the penalty-scoring function that computes a communication penalty indicating the user's perceived cost for releasing personal information.

Generating the Group-Activity Model

Figure 7:
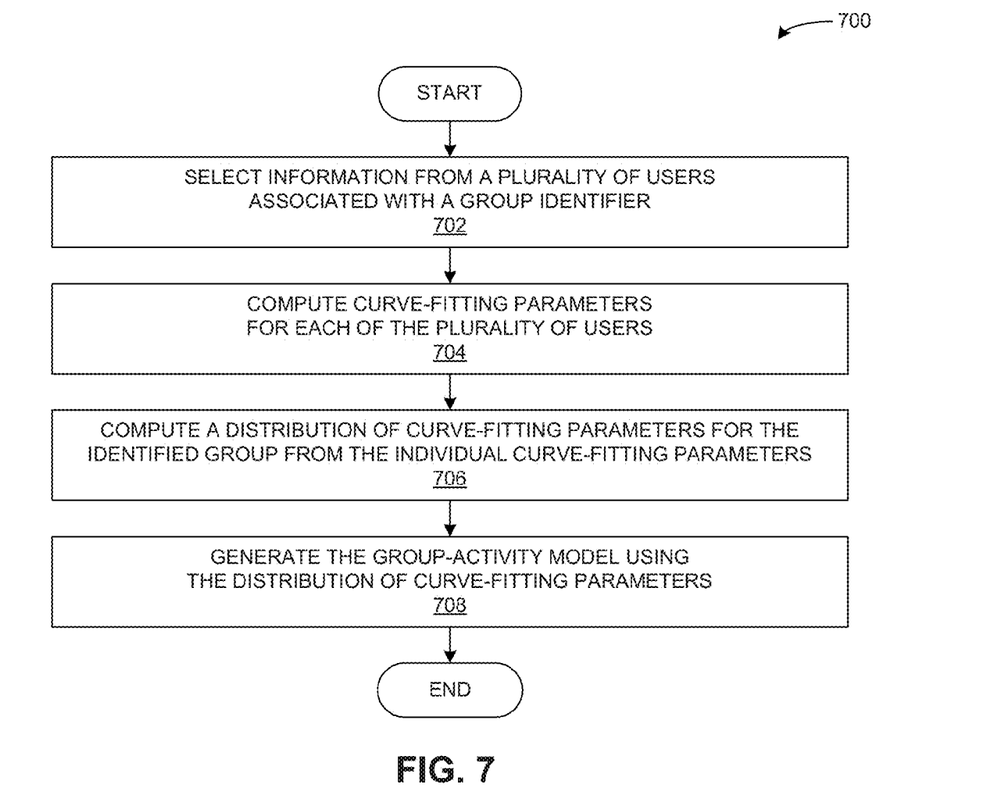
FIG. 7 presents a flow chart illustrating a method for computing curve-fitting parameters for a group-activity model in accordance with an embodiment.

FIG. 7 presents a flow chart illustrating a method 700 for generating a group-activity model for a user population in accordance with an embodiment. During operation, the population-modeling system selects information from a plurality of users that have been marked as an information source for the user population associated by a certain group identifier (operation 702). The system then computes curve-fitting parameters for each of the plurality of users using the selected information (operation 704). For example, the system can select aggregated data that represents behavior patterns for each user, and generates the curve-fitting parameters that can be used to generate an activity model. In some embodiments, however, the system can receive pre-computed curve-fitting parameters that were computed for individual users by their client devices. The system then computes a distribution of curve-fitting parameters for the identified group from the individual curve-fitting parameters (operation 706).

To compute each of the curve-fitting parameters for the group-activity model, the system can compute the average (or weighted average) for each of the model parameters of the population group. In some embodiments, the system determines weights for the individual users of the population group based on their utility score or an accuracy score, and uses these weights to compute a weighted value for each of the curve-fitting parameters. The user's accuracy score can indicate a likelihood that the user's activity-prediction model is able to predict its corresponding user's activity (or the activity of other users in the population group).

The distribution of curve-fitting parameters for the identified group can be represented as follows:

$$N_0(A,\sigma_0), N_1(B_1,\sigma_1), \ldots N_n(B_n,\sigma_n). \quad (7)$$

In equation (7), the symbol $N_i$ corresponds to a normal distribution for a corresponding curve-fitting parameter for users of the identified group. The values A and $B_i$ correspond to average values for their corresponding curve-fitting parameters, and a corresponds to a standard deviation for a corresponding curve-fitting parameter.

The system then generates the group-activity model using the distribution of curve-fitting parameters (operation 708). The group-activity model can include a function of the form:

$$p=\text{logit}(a+b_1*x_1+b_2*x_2+\ldots+b_n*x_n) \quad (8)$$

In equation (8), the coefficients a and $b_i$ correspond to curve-fitting parameters for the population group. The variable a is known as the intercept, and the variables $b_i$ are known as the regression coefficients. The value p specifies a probability that a user's contextual information ($x_i$) indicates that the user is performing the target activity. The variables $x_i$ in equation (8) correspond to real-time context feature values from the user that the system or the user's client device can use to generate the probability p.

Figure 8:
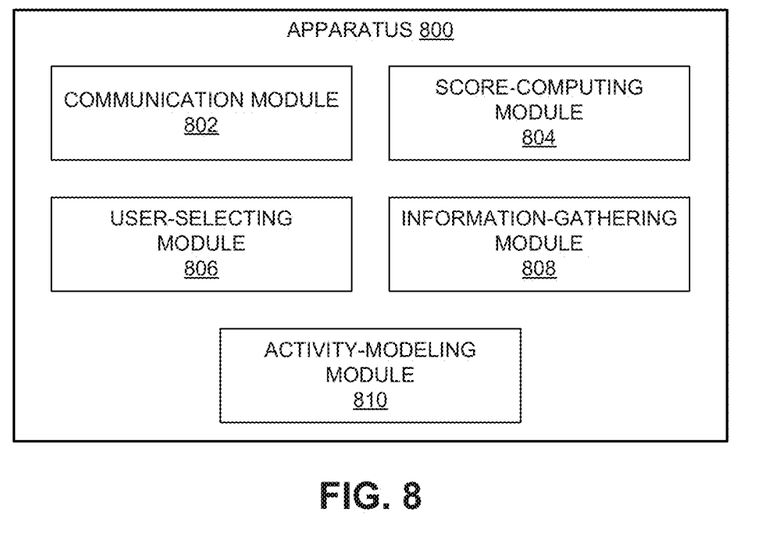
FIG. 8 illustrates an exemplary apparatus that facilitates generating a group-activity model for a user population in accordance with an embodiment.

FIG. 8 illustrates an exemplary apparatus 800 that facilitates generating a group-activity model for a user population in accordance with an embodiment. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, a score-computing module 804, a user-selecting module 806, an information-gathering module 808, and an activity-modeling module 810.

In some embodiments, communication module 802 can communicate with one or more client devices. Score-computing module 804 can compute utility scores for a set of users and accuracy scores for group-activity models. User-selecting module 806 can select, from a set of users that belong to a population group, a subset of users with highest utility scores. Information-gathering module 808 can receive user information from each of the selected users, and activity-modeling module 810 can generate a group-activity model based on the user information received from the selected users.

Figure 9:
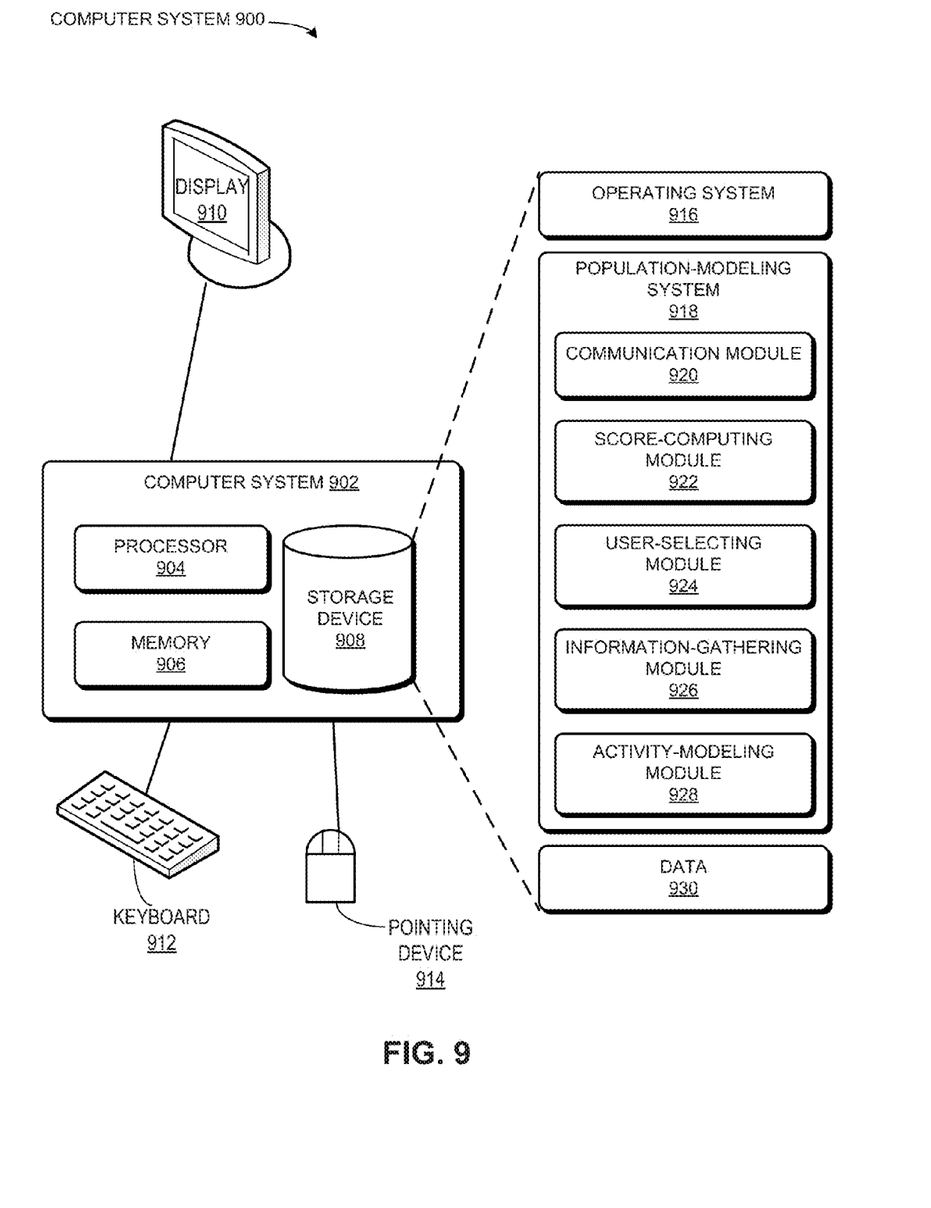
FIG. 9 illustrates an exemplary computer system that facilitates generating a group-activity model for a user population in accordance with an embodiment.

FIG. 9 illustrates an exemplary computer system 902 that facilitates generating a group-activity model for a user population in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a population-modeling system 918, and data 930.

Population-modeling system 918 can include instructions, which when executed by computer system 902, can cause computer system 902 to perform methods and/or processes described in this disclosure. Specifically, population-modeling system 918 may include instructions for communicating with one or more client devices (communication module 920). Population-modeling system 918 can include instructions for computing utility scores for a set of users and accuracy scores for group-activity models (score-computing module 922). Population-modeling system 918 can also include instructions for selecting, from a set of users that belong to a population group, a subset of users with highest utility scores (user-selecting module 924). Population-modeling system 918 can include instructions for receiving user information from each of the selected users (information-gathering module 926), and for generating a group-activity model based on the user information received from the selected users (activity-modeling module 828).

Data 930 can include any data that is required as input or that is generated as output by the methods and/or processes described in this disclosure. Specifically, data 930 can store at least user profiles, user behavior information, historical activities, population groups, group-activity models, and product or service recommendations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
computing, by a computing device, utility scores for a set of users based on a utility-scoring function, wherein a respective utility score indicates a usefulness or penalty of collecting a corresponding user's contextual information;
selecting, from the set of users, a subset of users with highest utility scores;
receiving user information from each of the selected users; and
generating a group-activity model based on the user information received from the selected users;
wherein the utility-scoring function has the form:

$$U(u)=a*I(u)-b*P(u);$$

wherein U is a utility score for the user information from user u, wherein a and b correspond to predetermined coefficients, wherein I(u) corresponds to an information-gain function that computes an information-gain score indicating the usefulness of the user's information, and wherein P(u) corresponds to a penalty-scoring function that computes a communication penalty indicating the user's perceived cost for releasing personal information.

2. The method of claim 1, wherein generating the group-activity model involves generating a set of group-parameter distributions:

$$N_0(A,\sigma_0), N_1(B_1,\sigma_1), \ldots N_n(B_n,\sigma_n);$$

wherein $N_i$ corresponds to a normal distribution for a corresponding curve-fitting parameter for users of the identified group, wherein A and $B_i$ correspond to average values for the corresponding curve-fitting parameters, and wherein $\sigma_i$ corresponds to a standard deviation for a corresponding curve-fitting parameter.

3. The method of claim 2, wherein the group-activity model includes an activity function of the form:

$$p=\text{logit}(a+b_1*x_1+b_2*x_2+\ldots+b_n*x_n);$$

wherein p is a probability that the determined information about the local user corresponds to a target activity, wherein a and $b_i$ correspond to the curve-fitting parameters, and wherein $x_i$ corresponds to a context feature value.

4. The method of claim 1, further comprising:
computing an accuracy score for the group-activity model based on an accuracy-scoring function and the user information received from the selected users.

5. The method of claim 4, further comprising:
computing a difference between the computed accuracy score and a previous accuracy score; and
generating an updated group-activity model in response to determining that the computed difference is greater than a minimum-threshold, wherein generating the updated group-activity model involves:
selecting, from the set of users, an additional subset of users with highest utility scores;
receiving user information from the additional subset of users; and
generating the updated group-activity model based on the user information received from the selected users.

6. The method of claim 1, further comprising:
determining one or more information-sharing parameters for a user, wherein the determined parameters include one or more of:
a parameter of an explicit privacy policy configured by the user;
a parameter of an implicit privacy policy determined for the user based on the user's behavior patterns;
an explicit reward obtained by the user for releasing personal information;
an implicit reward obtained by the user for releasing personal information;
a bandwidth cost to the user per unit of data communicated over a network; and
an energy cost to the user per unit of data communicated over the network; and
computing the user's communication penalty based on the determined information-sharing parameters.

7. The method of claim 1, wherein the user information includes at least one of:
contextual information;
profile information from a user profile;
historical activities performed by a user;
aggregated contextual information; and
aggregated activity information.

8. A non-transitory computer-readable storage medium storing instructions that when executed by a computer cause the computer to perform a method, the method comprising:
computing utility scores for a set of users based on a utility-scoring function, wherein a respective utility score indicates a usefulness or penalty of collecting a corresponding user's contextual information;
selecting, from the set of users, a subset of users with highest utility scores;
receiving user information from each of the selected users; and
generating a group-activity model based on the user information received from the selected users;
wherein the utility-scoring function has the form:

$$U(u)=a*I(u)-b*P(u);$$

wherein U is a utility score for the user information from user u, wherein a and b correspond to predetermined coefficients, wherein I(u) corresponds to an information-gain function that computes an information-gain score indicating the usefulness of the user's information, and wherein P(u) corresponds to a penalty-scoring function that computes a communication penalty indicating the user's perceived cost for releasing personal information.

9. The storage medium of claim 8, wherein generating the group-activity model involves generating a set of group-parameter distributions:

$$N_0(A,\sigma_0), N_1(B_1,\sigma_1), \ldots N_n(B_n,\sigma_n);$$

wherein $N_i$ corresponds to a normal distribution for a corresponding curve-fitting parameter for users of the identified group, wherein A and $B_i$ correspond to average values for the corresponding curve-fitting parameters, and wherein $\sigma_i$ corresponds to a standard deviation for a corresponding curve-fitting parameter.

10. The storage medium of claim 9, wherein the group-activity model includes an activity function of the form:

$$p=\text{logit}(a+b_1{}^*x_1+b_2{}^*x_2+\ldots+b_n{}^*x_n);$$

wherein p is a probability that the determined information about the local user corresponds to a target activity, wherein a and $b_i$ correspond to the curve-fitting parameters, and wherein $x_i$ corresponds to a context feature value.

11. The storage medium of claim 8, further comprising:
computing an accuracy score for the group-activity model based on an accuracy-scoring function and the user information received from the selected users.

12. The storage medium of claim 11, further comprising:
computing a difference between the computed accuracy score and a previous accuracy score; and
generating an updated group-activity model in response to determining that the computed difference is greater than a minimum-threshold, wherein generating the updated group-activity model involves:
   selecting, from the set of users, an additional subset of users with highest utility scores;
   receiving user information from the additional subset of users; and
   generating the updated group-activity model based on the user information received from the selected users.

13. The storage medium of claim 8, further comprising:
determining one or more information-sharing parameters for a user, wherein the determined parameters include one or more of:
   a parameter of an explicit privacy policy configured by the user;
   a parameter of an implicit privacy policy determined for the user based on the user's behavior patterns;
   an explicit reward obtained by the user for releasing personal information;
   an implicit reward obtained by the user for releasing personal information;
   a bandwidth cost to the user per unit of data communicated over a network; and
   an energy cost to the user per unit of data communicated over the network; and
computing the user's communication penalty based on the determined information-sharing parameters.

14. The storage medium of claim 8, wherein the user information includes at least one of:

contextual information;
profile information from a user profile;
historical activities performed by a user;
aggregated contextual information; and
aggregated activity information.

15. An apparatus, comprising:
a processor;
a memory;
a score-computing module to compute utility scores for a set of users based on a utility-scoring function, wherein a respective utility score indicates a usefulness or penalty of collecting a corresponding user's contextual information;
a user-selecting module to select, from the set of users, a subset of users with highest utility scores;
an information-gathering module to receive user information from each of the selected users; and
an activity-modeling module to generate a group-activity model based on the user information received from the selected users;
wherein the utility-scoring function has the form:

$$U(u)=a{}^*I(u)-b{}^*P(u);$$

wherein U is a utility score for the user information from user u, wherein a and b correspond to predetermined coefficients, wherein I(u) corresponds to an information-gain function that computes an information-gain score indicating the usefulness of the user's information, and wherein P(u) corresponds to a penalty-scoring function that computes a communication penalty indicating the user's perceived cost for releasing personal information.

16. The apparatus of claim 15, wherein while generating the group-activity model the activity-modeling module is further configured to generate a set of group-parameter distributions:

$$N_0(A,\sigma_0), N_1(B_1,\sigma_1), \ldots N_n(B_n,\sigma_n);$$

wherein $N_i$ corresponds to a normal distribution for a corresponding curve-fitting parameter for users of the identified group, wherein A and $B_i$ correspond to average values for the corresponding curve-fitting parameters, and wherein $\sigma_i$ corresponds to a standard deviation for a corresponding curve-fitting parameter.

17. The apparatus of claim 16, wherein the group-activity model includes an activity function of the form:

$$p=\text{logit}(a+b_1{}^*x_1+b_2{}^*x_2+\ldots+b_n{}^*x_n);$$

wherein p is a probability that the determined information about the local user corresponds to a target activity, wherein a and $b_i$ correspond to the curve-fitting parameters, and wherein $x_i$ corresponds to a context feature value.

18. The apparatus of claim 15, wherein the score-computing module is further configured to compute an accuracy score for the group-activity model based on an accuracy-scoring function and the user information received from the selected users.

19. The apparatus of claim 18, wherein the activity-modeling module is further configured to:
compute a difference between the computed accuracy score and a previous accuracy score; and
generate an updated group-activity model in response to determining that the computed difference is greater than a minimum-threshold, wherein generating the updated group-activity model involves:
   selecting, from the set of users, an additional subset of users with highest utility scores;

receiving user information from the additional subset of users; and generating the updated group-activity model based on the user information received from the selected users.

20. The apparatus of claim 15, wherein the score-computing module is further configured to:

determine one or more information-sharing parameters for a user, wherein the determined parameters include one or more of:

a parameter of an explicit privacy policy configured by the user;

a parameter of an implicit privacy policy determined for the user based on the user's behavior patterns;

an explicit reward obtained by the user for releasing personal information;

an implicit reward obtained by the user for releasing personal information;

a bandwidth cost to the user per unit of data communicated over a network; and an energy cost to the user per unit of data communicated over the network; and compute the user's communication penalty based on the determined information-sharing parameters.

21. The apparatus of claim 15, wherein the user information includes at least one of:

contextual information;

profile information from a user profile;

historical activities performed by a user;

aggregated contextual information; and aggregated activity information.

\* \* \* \* \*